United States Patent [19]

Terashita et al.

[11] Patent Number: 5,404,196
[45] Date of Patent: Apr. 4, 1995

[54] METHOD OF MAKING PHOTOGRAPHIC PRINTS

[75] Inventors: Takaaki Terashita; Naoto Kinjo; Kunihiko Kanafusa; Shinpei Ikenoue, all of Kanagawa, Japan

[73] Assignee: Fuji Photo Film Co., Ltd., Kanagawa, Japan

[21] Appl. No.: 944,294

[22] Filed: Sep. 14, 1992

[30] Foreign Application Priority Data

Sep. 12, 1991 [JP] Japan .................... 3-261125
Sep. 12, 1991 [JP] Japan .................... 3-261126
Oct. 31, 1991 [JP] Japan .................... 3-286901

[51] Int. Cl.⁶ ......................................... G03B 27/52
[52] U.S. Cl. .................................. 355/77; 355/68; 355/40; 355/41; 355/38; 354/21; 354/105; 354/409
[58] Field of Search ............... 355/68, 41, 40, 38, 355/77; 354/105, 106, 475, 21, 409, 410, 470, 430, 471; 430/140

[56] References Cited

U.S. PATENT DOCUMENTS

| | | | |
|---|---|---|---|
| 4,814,802 | 3/1989 | Ogawa | 354/105 |
| 4,965,628 | 10/1990 | Olliver et al. | 355/41 |
| 4,969,005 | 11/1990 | Tokunaga | 354/414 |
| 4,974,017 | 11/1990 | Terashita | 355/38 |
| 5,016,039 | 5/1991 | Sosa et al. | 354/430 |
| 5,019,854 | 5/1991 | Mukai et al. | 354/471 |
| 5,023,656 | 6/1991 | Terashita | 355/41 |
| 5,029,312 | 7/1991 | Goenner | 355/38 |

FOREIGN PATENT DOCUMENTS

| | | |
|---|---|---|
| 0246010 | 11/1987 | European Pat. Off. . |
| 0443497 | 8/1991 | European Pat. Off. . |
| 3620525 | 1/1987 | Germany . |
| 3913803 | 11/1989 | Germany . |
| 2176677 | 12/1986 | United Kingdom . |
| 2240512 | 8/1991 | United Kingdom . |

Primary Examiner—David M. Gray
Assistant Examiner—D. P. Malley
Attorney, Agent, or Firm—Sughrue, Mion, Zinn, Macpeak & Seas

[57] ABSTRACT

A method of making photographic prints wherein photographic data relating to photographic conditions of an original frame is recorded on a photographic film at the time of photographing the original frame, so as to determine the print exposure amount for printing the original frame. When it is determined with reference to the photographic data that a primary subject of the original frame has a proper density on the photographic film, the original frame is printed at a basic print exposure amount which is determined without using density data of the original frame. If it is determined with reference to the photographic data that the basic print exposure amount should be corrected for the original frame, an exposure correction amount is calculated based on the photographic data and/or the density data of the original frame. The photographic data is, for example, discrimination data for indicating whether the original frame has been photographed under a proper exposure control, or brightness values measured in a plurality of divisional areas. The photographic data may also be primary subject position data for deriving the density of the primary subject from the density data of the original frame.

21 Claims, 14 Drawing Sheets

■···BRIGHTNESS MEASUREMENT SPOT

METHOD OF MAKING PHOTOGRAPHIC PRINTS

BACKGROUND OF THE INVENTION

1. Field of the Invention

The present invention relates to a photographic printing method and more particularly to a photographic printing method which determines a print exposure amount so as to optimize the print density of the primary subject by using photographic data recorded at a time of photographing the image.

2. Description of the Related Art

In making photographic prints, it is known to first determine a basis print exposure amount based on an average density of each original frame recorded in photographic film, for example, LATD (Large Area Transmitting Density), and to then calculate an exposure correction based upon data representative of characteristics of each scene of the original frame, in order to determine a suitable print exposure amount. The suitable print exposure amount is determined by statistical analysis in such a photographic printing method.

Although it is necessary to correct the print exposure amount when the density of a primary subject on the photographic film differs greatly from the average density of the whole area of the original frame including the primary subject, it is impossible in the above-described conventional photographic printing method to precisely detect the primary subject density on the photographic film because the position of the primary subject within the original frame is not always the same.

Therefore, it is hard to determine a proper correction of the print exposure amount. When the primary subject is disposed out of a central area of the original frame, it is even more difficult to determine the primary subject density on the photographic film, and hence the precision of the correction is lowered.

Furthermore, even when the original frames have been taken with a camera having a high-precision exposure control device, conventional print exposure determination is not affected. As a result, there is almost no difference in exposure accuracy between the photographic prints made from original frames taken by low-performance cameras, on one hand, and the photographic prints made from original frames taken by high-performance cameras.

Recent cameras have a high-precision automatic exposure control system allowing images of the subjects to be automatically photographed at a proper exposure value. For example, the exposure value of the camera is automatically determined in accordance with the brightness of a primary subject which is selected automatically or by manually focusing on the primary subject. Therefore, it is possible, with such a camera, to make proper prints from the original frames taken by such a high-precision camera, while printing at a constant print exposure amount, for example, for a constant print exposure time, which is predetermined according to the type of photographic paper and the print magnification, without measuring the density of each original frame for determining the respective print exposure amount.

However, if all the original frames are printed at a constant exposure time, photographic prints of some scenes which are, for various reasons, out of the functioning range of the automatic exposure control of the camera, would contain improperly finished images of the primary subjects therein. Such a case would arise, for example, when the density of the primary subject on the photographic film differs greatly from the average density of the original frame, as is described above.

SUMMARY OF THE INVENTION

In view of the foregoing, an object of the present invention is to provide a photographic printing method by which the photographic print is finished so as to optimize the print density of the primary subject.

Another object of the invention is to provide a photographic printing method which eliminates any degradation of the quality of the photographic prints due to limitations of the exposure control of the camera.

To achieve the above and other objects, a method of making photographic prints of the present invention measures brightness values of a subject distinctively in a primary subject area and a background area, and controls an exposure value based on these brightness values, especially on the brightness value of the primary subject area, so as to optimize the density of a primary subject disposed in the primary subject area of the original frame. During photographing a frame of the subject, photographic data relating to photographic conditions of the frame is recorded on a photographic negative in association with the image. When it is determined with reference to the photographic data that a primary subject of the original frame has a proper density, the frame is printed at a basic print exposure amount which is determined without using density data of the frame. If it is determined with reference to the photographic data that the basic print exposure amount should be corrected for the frame, an exposure correction amount is calculated based on the photographic data and/or the density data of the frame.

According to an embodiment of the invention, the photographic data is discrimination data which indicates whether or not the frame has been photographed under proper exposure control. If the discrimination data indicates that the frame is a properly exposed frame, the frame is printed at a basic print exposure amount which is determined based upon a properly exposed standard image and changed, for example, according to the film type.

According to another embodiment, a coordinate relating to at least two parameters is used for determining whether the frame is photographed under a photographic condition which can be dealt with by the automatic exposure control of the camera, and the parameters are derived from the photographic data. The coordinate is sectioned into several correction ranges, to each of which an equation for calculating an exposure correction amount is allocated. The parameters are also used as the factors of the equation. In this embodiment, the photographic data is, for example, brightness values measured in the primary subject area and the background area.

According to a further embodiment, the photographic data is data representative of primary subject position for deriving the density of the primary subject within the original frame from the density data of the original frame which is measured, for example, by three color separation of each pixel of the frame.

As described above, the present invention determines the print exposure amount with reference to the photographic data representing the conditions during photographing of the subject, especially the exposure condition of the image of the primary subject. If necessary, a print exposure correction amount is determined based on the photographic data in combination with the density data of the original frame. Therefore, it is possible to optimize the print density of the primary subject compared with the conventional printing methods wherein only the density data of the original frame is used for determining the print exposure amount.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding pans throughout the several views, and wherein.

DETAILED DESCRIPTION OF THE PREFERRED EMBODIMENT

Figure 1:
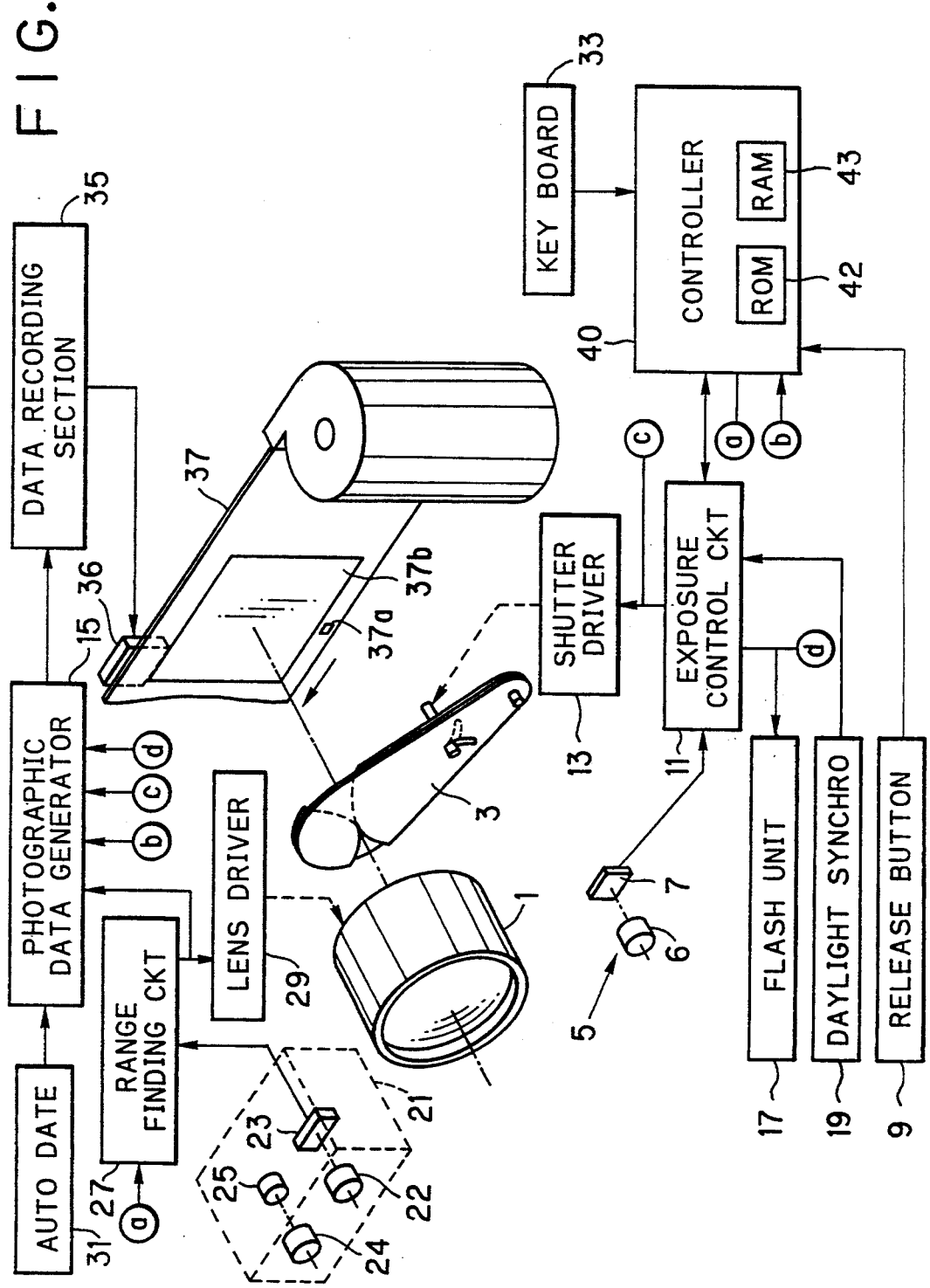
FIG. 1 is a schematic representation of a camera having a photographic data recording function for use in a first embodiment of the invention.

FIG. 1 illustrates a camera which can record photographic data on the film, wherein a shutter mechanism 3 is disposed behind a taking lens 1. A brightness measurement unit 5 is constituted by a lens 6 and an image area sensor 7, and measures the subject brightness values (BV) of a plurality of divisional areas of the image being photographed through lens 1.

Figure 2:
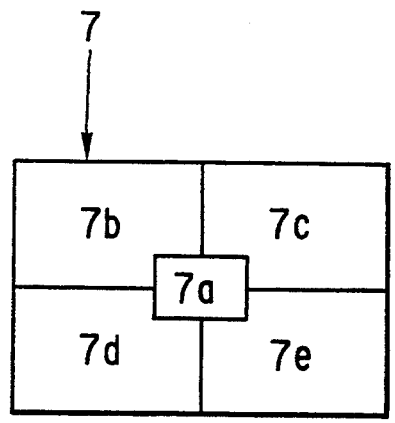
FIG. 2 is an explanatory view of an image area sensor for brightness measurement of the camera shown in FIG. 1.

The image area sensor 7 is divided into a central area 7a and peripheral areas 7b to 7e surrounding the central area 7a, as shown in FIG. 2. Data relating to the subject brightness value of the respective area 7a to 7e are sent to an exposure control circuit 11. The exposure control circuit 11 calculates a light value (LV) based on these subject brightness values and the subject brightness value of the central area in particular and film speed data. The shutter mechanism 3 is controlled in a preprogrammed manner, based upon the light value, through a shutter driver 13. The exposure control circuit 11 also sends the subject brightness data (data corresponding to the subject brightness values) of the respective areas 7a to 7e to a photographic data generator 15.

The exposure control circuit 11 includes a conventional subject brightness discrimination circuit for automatically activating a flash unit 17 in synchronism with the shutter mechanism 3 when the subject brightness is below a predetermined level. Also, a daylight-synchro switch 19 is provided for activating the flash mechanism 17 even when the subject brightness is equal to or above the predetermined level if the daylight-synchro switch 19 is turned on. A flash signal and a daylight synchro flash signal, indicating the use of flash unit 17, are sent from the exposure control circuit 11 to the photographic data generator 15.

A range finding sensor unit 21 includes a light receiving section constructed by a lens 22 and a line sensor 23, and a light projecting section constructed by a lens 24 and a light source, for example, a light emission diode (LED) 25. During the range finding operation which is effected by partially depressing the release button 9, a near infrared light beam is projected from the light projecting section toward a primary subject, and the light reflected from the primary subject falls incident on the line sensor 23. The output signal from the line sensor 23 is sent to a range finding circuit 27 which determines the position of the line sensor 23 on which the reflected light was incident, thereby detecting the distance from the camera to the primary subject. Data relating to the subject distance is sent to a lens setting driver 29 which, upon full depression of the release button 9, sets the taking lens 1 at a focusing position corresponding to the subject distance. The subject distance data outputted from the range finding circuit 27 also is sent to the photographic data generator 15.

The photographic data generator 15 also receives photographing time data and other data from an autodate (automatic date recording) unit 31. Codes or symbols indicating the kind of photographic scenes, which are entered by the photographer through a keyboard 33, are sent to the photographic data generator 15. The photographic data generator 15 codes the respective photographic data, and sends the corresponding data codes to a data recording section 35. The data recording section 35 drives an LED 36 so as optically to record the photographic data in the form of a digital code in a blank margin of a corresponding original image frame of the film.

A controller 40, which can be a conventional microcomputer, sequentially controls respective sections of the camera in accordance with a program stored in a ROM 42 incorporated in the controller 40. The controller 40 includes a RAM 43, in which the photographic data from the photographic data generator 13 is stored, and from which the photographic data may be transferred to an external memory, such as a memory card, or the like.

Figure 3:
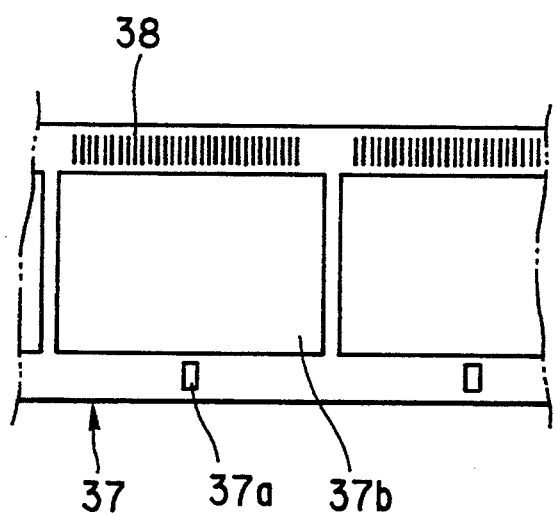
FIG. 3 is an illustration of an example of photographic film having the photographic data recorded thereon.

FIG. 3 shows an example of a photographic film with the distance information recorded thereon. This photographic film 37 has perforations 37a formed therein at a constant pitch. The perforations 37a are detected by a sensor of a feed stop device (not shown) so as to cause the film to be fed one frame at a time. The original frames 37b are recorded on a photosensitive emulsion surface of the photographic film 37 in association with the respective perforations 37a. The digital code is recorded in the emulsion on a side of the original frame 37b opposite the perforation 37a in the form of a bar code 38 or any other suitable code.

Figure 4:
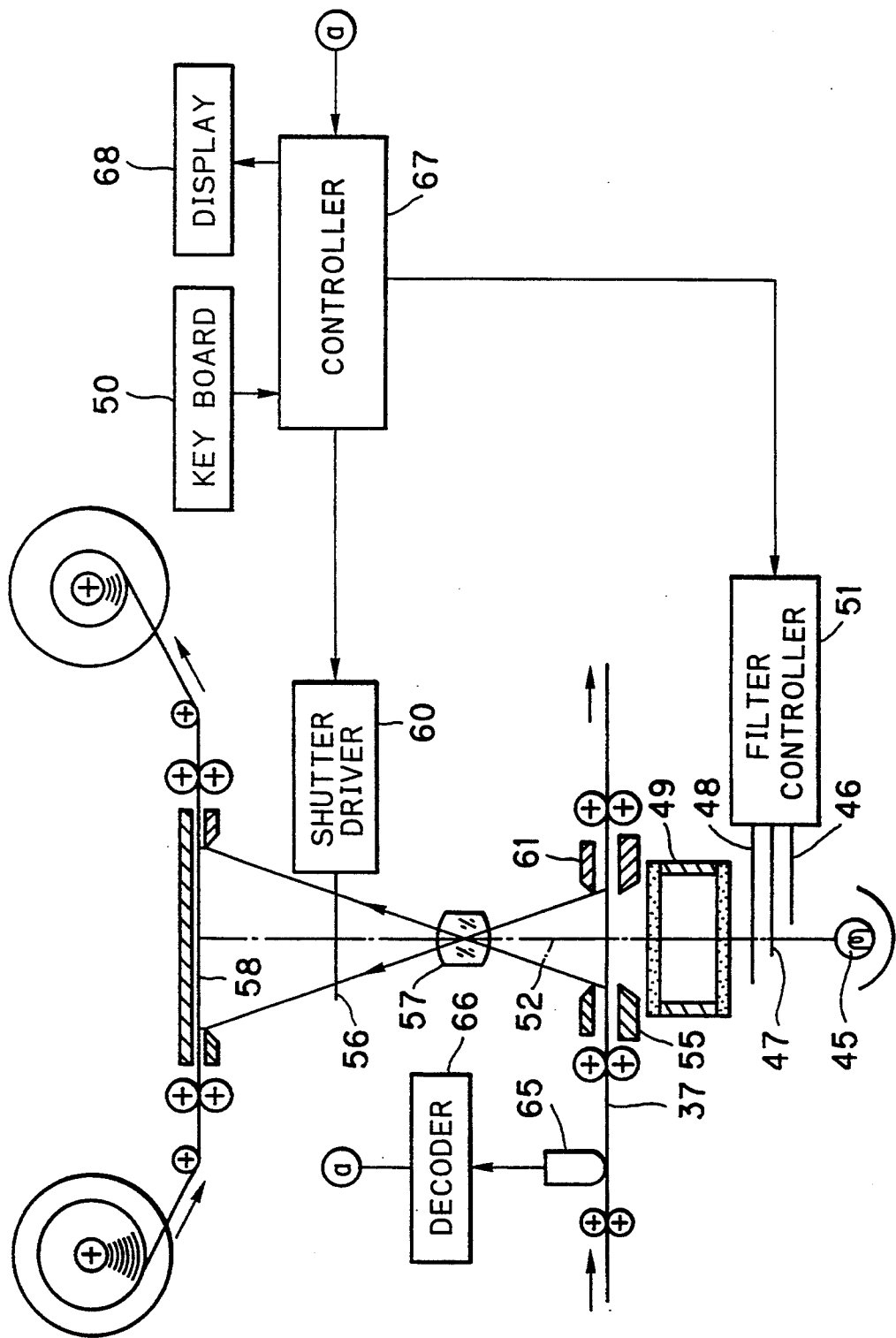
FIG. 4 is a schematic representation of a photographic printer for use in the first embodiment of the invention.

FIG. 4 illustrates a photographic printer, in which a white light radiated from a light source 45 passes through a cyan filter 46, a magenta filter 47, and a yellow filter 48, and enters a mixing box 49. These color correction filters 46 to 48 are fixed in a predetermined position for printing ordinary original frames. When the operator enters a correction value through a keyboard 50 for an original frame which needs special correction, the degree of insertion of these color correction filters 46 to 48 into an optical path 52 is controlled by a filter controller 51 in accordance with the entered correction value, so that three color components and intensities of printing light are regulated. The mixing box 49 is constructed of a rectangular tube having an inner mirror surface and diffusion plates mounted on both opposite ends of the rectangular tube.

A film carrier 55 is disposed at the printing stage. A developed photographic film 37 is placed in the film carrier 55, and is illustrated with light transmitted through the mixing box 49. The light transmitted through an original frame of the photographic film 37 is focused by a printing lens 57 onto a photosensitive emulsion surface of photographic paper 58 while a shutter 56 is opened, so that a latent image of the original frame is printed on the photographic paper 58. The shutter 56 is driven by a shutter driver 60 to open for an appropriate time period. The film carrier 55 is provided with a film mask 61 which is mounted at the printing stage, for ensuring the evenness of the photographic film 37. The film mask 61 is formed with an opening corresponding to the size of a frame as is well known in the art. The film mask 61 is raised up by a solenoid (not shown) while the photographic film 37 is being fed, and then is lowered to press the photographic film 37 during the printing operation.

A bar code reader 65 is mounted at the upstream portion of the printing stage to read the bar code 38 recorded in association with the original frame while the photographic film 37 is fed to the printing stage. The bar code 38, which has been read by bar code reader 65, is decoded, by a decoder 66, into a photographic data signal usable in the photographic printer and, thereafter, is sent to a controller 67 of the photographic printer. Of course, the bar code reader 65 can be replaced by any type of reader suitable for reading the data. For example, character data can be recorded and a character reader can be utilized.

The controller 67, which may be a conventional microcomputer, calculates a print exposure correction amount based on the data representing the central area brightness and the peripheral area brightness of the photographic data read from the photographic film 37, and calculates a proper print exposure amount based on a basic print exposure amount and the exposure correction amount. The controller 67 controls the shutter driver 60 so as to open the shutter 57 for a given time that is determined according to the proper print exposure amount. It is possible to predetermine a basic print exposure time corresponding to the basic print exposure amount and determine a proper print exposure time by adding a correction time, which is calculated based on the print exposure correction amount, to the basic print exposure time. A display 68 is connected to the controller 67 for displaying data entered through the keyboard 50 and/or read from the photographic film 37.

Figure 5:
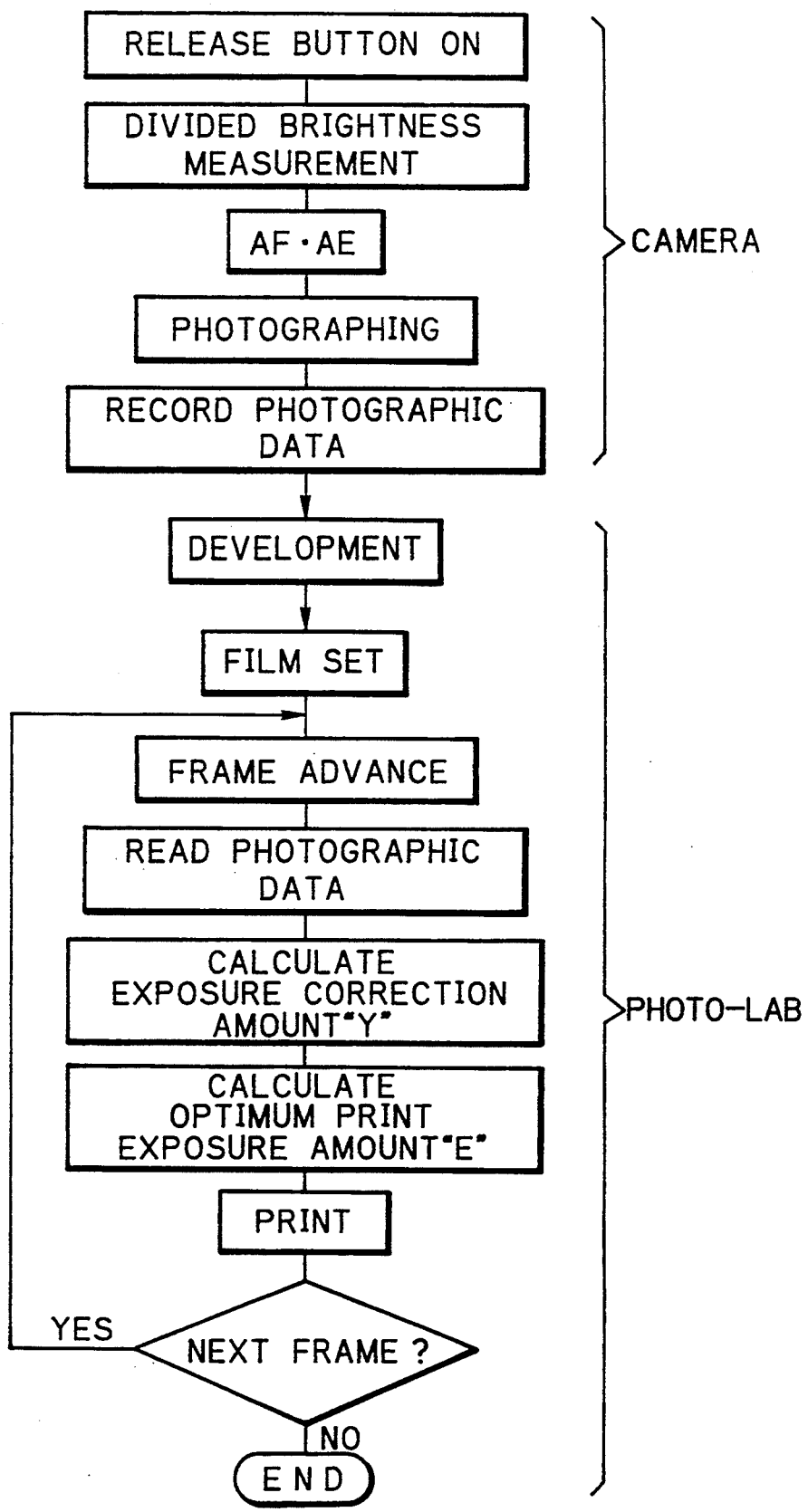
FIG. 5 is a flow chart illustrating the procedure of making photographic prints according to the first embodiment of the invention.

FIG. 5 illustrates a routine for making photographic prints according to the above-described embodiment. First, the camera performs a divided brightness measurement in the central area 7a and the peripheral areas 7b to 7e, and makes a photograph under an exposure control which uses the brightness values measured in these divisional areas. Typically, emphasis is placed on the brightness in the central area 7a, i.e., it is weighted heavier than the brightness in the peripheral areas 7b to 7e. Simultaneously with the photographing, both the central and peripheral area brightness data are recorded on the photosensitive emulsion surface of the photographic film in the form of a bar code 38. It is to be noted that when the release button 9 is partially depressed while framing the primary subject in the central area of the view field, the focus is locked at the primary subject, and the exposure is also locked at this condition. Therefore, the photographer can move the camera thereafter, so as to change the position of the primary subject within the viewfinder while depressing the release button halfway. When the release button 9 is fully depressed, an exposure is made.

After exposing an entire area of a strip of photographic film 37, the photographic film 37 is forwarded to a photofinishing laboratory, wherein developing and printing of the photographic film 37 is performed. In printing each image, the bar code reader 65 reads the corresponding bar code 38 recorded on the photographic film 37. The decoder 66 converts the bar code signal into the central area brightness data and the peripheral area brightness data, and sends this data to the controller 67. The controller 67 calculates a print exposure correction amount based on the central area brightness data and the peripheral area brightness data.

Figure 6:
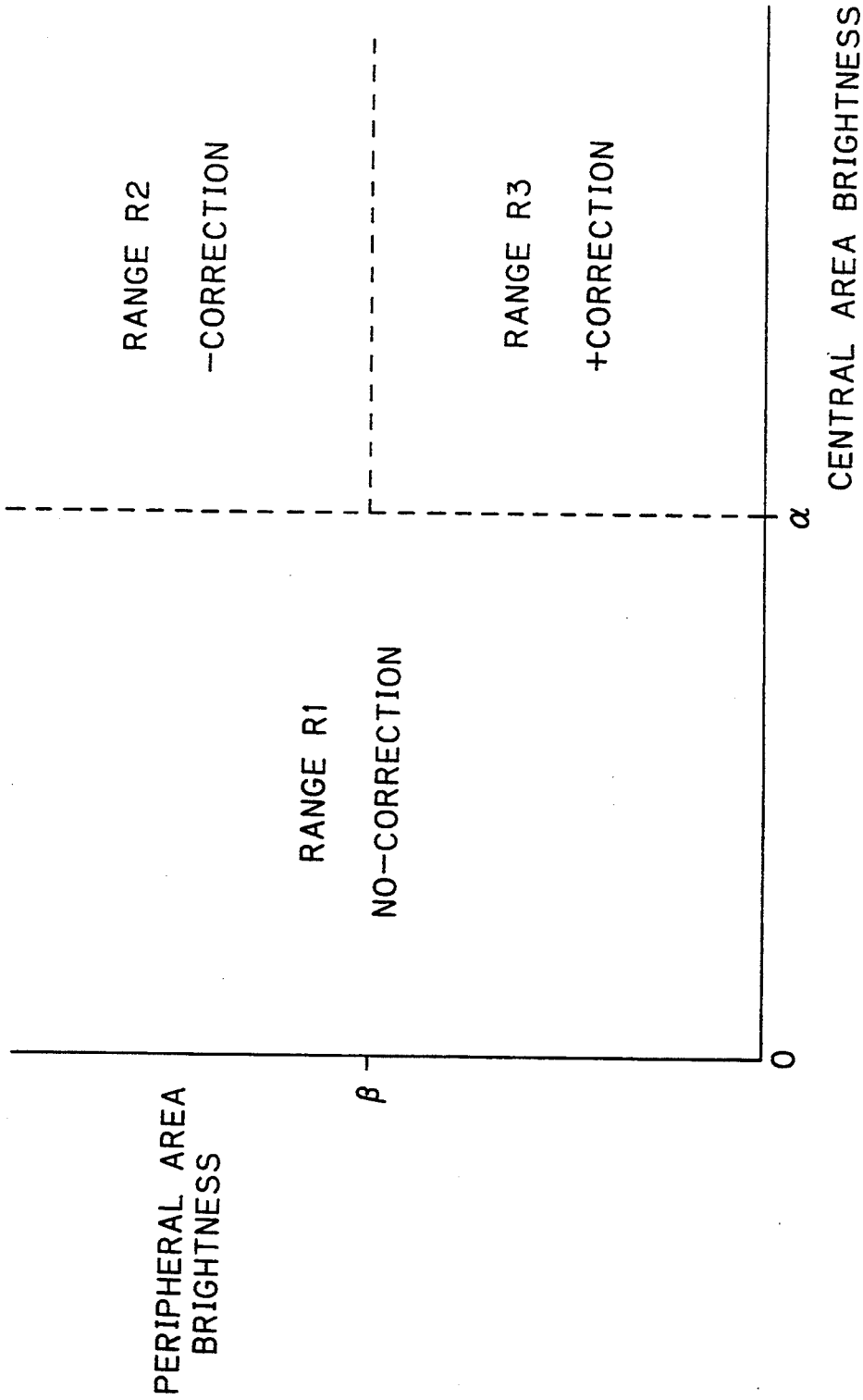
FIG. 6 is a coordinate graph for use in calculating a print exposure correction amount based on the central area brightness data and the peripheral area brightness data.

According to the preferred embodiment, central area brightness data and peripheral area brightness data included in the photographic data are used as the parameters for the print exposure correction. First, it is determined which correction range the scene of the original frame belongs to, with reference to the coordinate graph shown in FIG. 6. The coordinate of FIG. 6 shows a relationship between the central area brightness and the peripheral area brightness, the horizontal axis of which represents the central area brightness, and the vertical axis of which represents the peripheral area brightness. The coordinative plane is sectioned into three ranges R1 to R3. A correcting direction and a group of parameters for the print exposure correction are allocated to each of the ranges R1 to R3.

The range R1 corresponds to scenes wherein the central area brightness is less than a predetermined value $\alpha$. For such scenes, a proper exposure control can be automatically effected by the camera. Accordingly, the images of the primary subjects in the original frames falling in this range generally have a proper density.

Therefore, the basic print exposure amount is not corrected for the scenes that fall into range R1.

The range R2 corresponds to scenes wherein the central area brightness is equal or more than the predetermined value α and the peripheral area brightness is equal or more than a predetermined value β. These scenes tend to be rear-lighted photographs. Because the divided brightness measurement system in the camera detects the brightness values of all divisional areas, and uses these brightness values for the exposure control, the central area, that is mostly the primary subject area, tends to be under-exposed in the rear-lighted photograph due to the relatively high brightness of the peripheral area, that is, the background brightness. In such a case, the negative image of the primary subject tends to be a low density level so that the print density of the primary subject in the photographic print would be improperly high if the photographic print is made by using a print exposure time that is determined based on the basic print exposure amount. For this reason, when the scene falls into range R2, a negative correction is performed to the printing exposure amount so as to obtain a proper print density of the primary subject.

It is to be noted that it is generally known to weight the peripheral area brightness with a factor less than 1 while the central area brightness is weighted with a factor 1 in the above-described brightness measurement system.

The range R3 corresponds to scenes wherein the central area brightness is equal to or more than the predetermined value α and the peripheral area brightness is less than the predetermined value β. These scenes tend to be front-lighted photographs. For the reasons indicated above, the central area tends to be over-exposed in the front-lighted photograph due to the relatively low brightness of the peripheral area. In such a case, the negative image of the primary subject tends to be a high density level, so that the print density of the primary subject of the photographic print would be improperly low if the photographic print is made by using a print exposure time that is determined based on the basic print exposure amount. Therefore, the scenes falling into range R3 are subjected to a positive correction of the exposure amount in printing so as to obtain a proper print density of the primary subject.

Specifically, the print exposure correction amount Y for the basic print exposure amount X is calculated according to the following equation:

$$Y = a1 \cdot Z1 + a2 \cdot Z2 + a3 \cdot Z3 + a4 \cdot Z4 + a5 \cdot Z5$$

wherein a1 to a5 are factors predetermined by statistical analysis and have different values for each range R1, R2, R3; and Z1 to Z5 are brightness values detected from the divisional measurement areas 7a to 7e, respectively.

The basic print exposure amount X is corrected by the print exposure correction amount Y, thereby obtaining a proper print exposure amount E (=X+Y). Then a print exposure time is calculated based on the proper print exposure amount E, and the shutter driver 60 is controlled according to the print exposure time.

Figure 7:
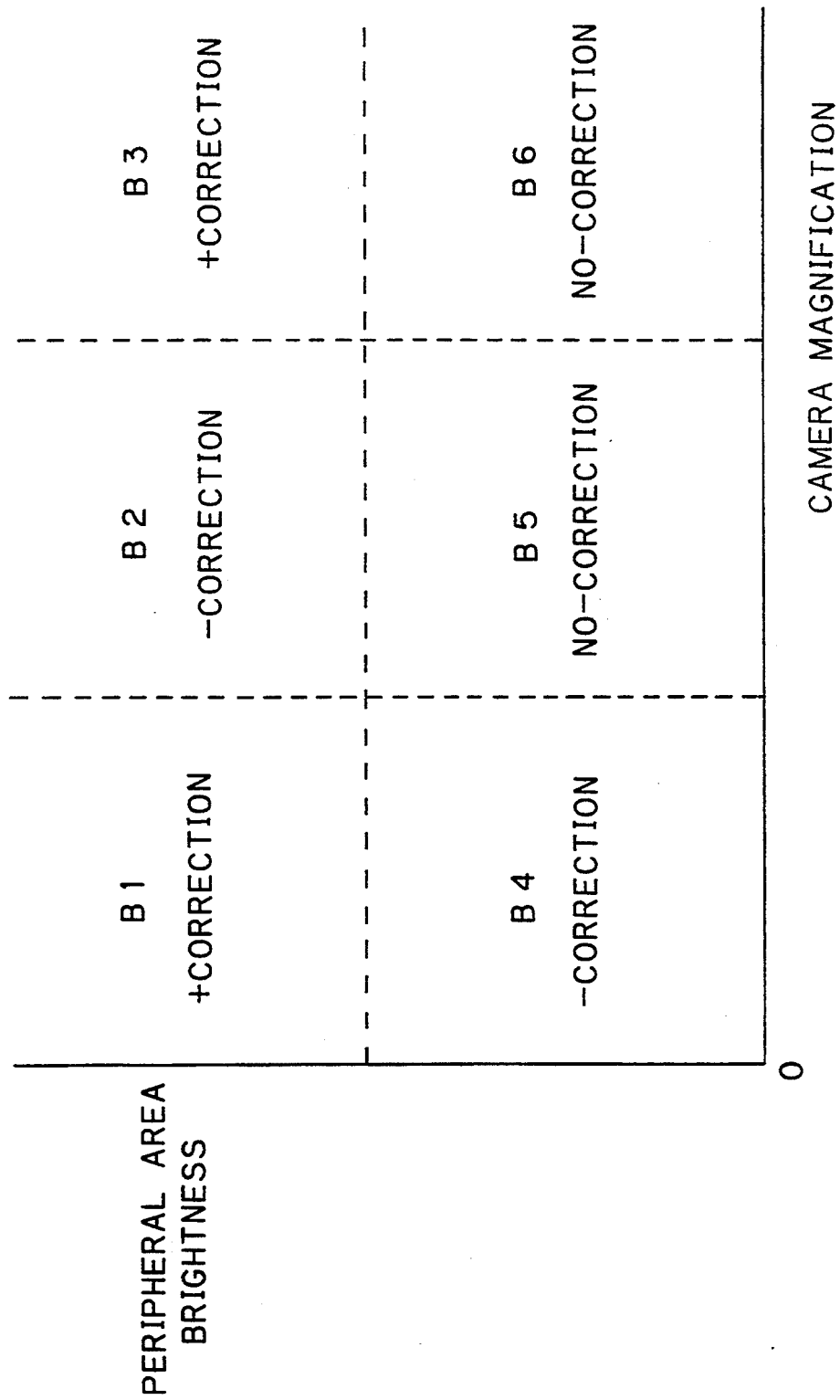
FIG. 7 is a coordinate graph for use in calculating a print exposure correction amount based on the camera magnification data and the peripheral area brightness data.

According to another embodiment of the invention, the peripheral area brightness and the camera magnification data are used as the parameters for determining the print exposure correction amount. In this embodiment, a two-dimensional coordinate graph, as shown in FIG. 7, is used. The vertical axis represents the peripheral area brightness, and the horizontal axis represents the camera magnification. The coordinative plane of this coordinate is sectioned into six ranges B1 to B6, and a specific print exposure correction is effected individually for each range.

The range B1 corresponds to those scenes wherein the peripheral area brightness is high and the camera magnification is set at a low level. Such scenes include, for example, a distant landscape. Because the scene belonging to the range B1 tends to have an over-exposed primary subject, a positive correction is applied to the exposure amount in printing. The range B2 corresponds to those scenes wherein the peripheral area brightness is high and the camera magnification is set at a middle level. Such scenes include, for example, a near landscape. Because the scene belonging to the range B2 tends to have an under-exposed primary subject, a negative correction is applied to the exposure amount in printing. The range B3 corresponds to those scenes wherein the peripheral area brightness is high and the camera magnification is set at a high level. Such scenes include, for example, a landscape photograph taken at a high telephoto ratio. Because the scene belonging to the range B3 tends to have an over-exposed primary subject, a positive exposure correction is executed in printing. The range B4 corresponds to those scenes wherein the peripheral area brightness is low and the camera magnification is set at a low level. Such scenes include, for example, a distant landscape. Because the scene belonging to the range B4 tends to have an under-exposed primary subject, a negative exposure correction is executed in printing. The ranges B5 and B6 correspond to those scenes wherein the peripheral area brightness is high and the camera magnification is set at a low level. Such scenes include, for example, a close-up photograph. Because the scenes belong to these ranges B5 and B6 are scarcely affected by the peripheral area brightness, and are photographed at an optimum exposure determined mainly on the basis of the central area brightness, there is no need for print exposure correction.

Although the above-described embodiments use the central area brightness in combination with the peripheral area brightness, or the peripheral area brightness in combination with the camera magnification, as parameters for determining whether, and to what degree, a print exposure correction should be performed, it is possible to utilize other photographic data. For example, the difference between the central and the peripheral area brightness in combination with the camera magnification can be used.

It is also possible to use density data obtained from the original frame recorded on the photographic film, such as the average density, divisional area density and density distribution of the original frame. Furthermore, it is possible to use the photographic data obtained during photographing the image in combination with the density data of the original frame on the film.

In other words, the parameters for calculating the exposure correction amount are not limited to the above-described embodiments, but the density data of the original frame and/or other data may be used instead.

Although the above described embodiment makes use of the subject distance data as the camera magnification data, other data may be used as the camera magnification data as long as the size of the primary subject within the original frame can be estimated from that data. For example, data representing the focal length of the taking lens may be used as the camera magnification data.

The two-dimensional coordinate system for discriminating the necessity and direction of the print exposure correction may be replaced by a three-dimensional coordinate system which, for example, represents the relationship between the central area brightness and the peripheral area brightness and the camera magnification. It is also possible to use these parameters in calculating the exposure correction amount.

In the above-described embodiments, those original frames which need the print exposure correction in order to obtain a proper print density of the primary subject can be sorted out in the printing process by using a coordinate graph system of photographic parameters, with reference to the photographic data of each original frame recorded on the photographic film during photographing. Therefore, it may be possible to feed back the results of sorting to the automatic exposure control of the camera in some manner. Thereby, precision of the exposure control of the camera can be improved.

FIGS. 8 to 11 illustrate a third embodiment of the invention wherein discrimination data is recorded on the photographic film for discriminating between those original frames which are judged to be properly exposed under the automatic exposure control of the camera and those original frames which contain such scenes that cannot be properly exposed under the automatic exposure control of the camera, such as a rear-lighted scene. The print exposure correction is effected with reference to the discrimination data.

Figure 8:
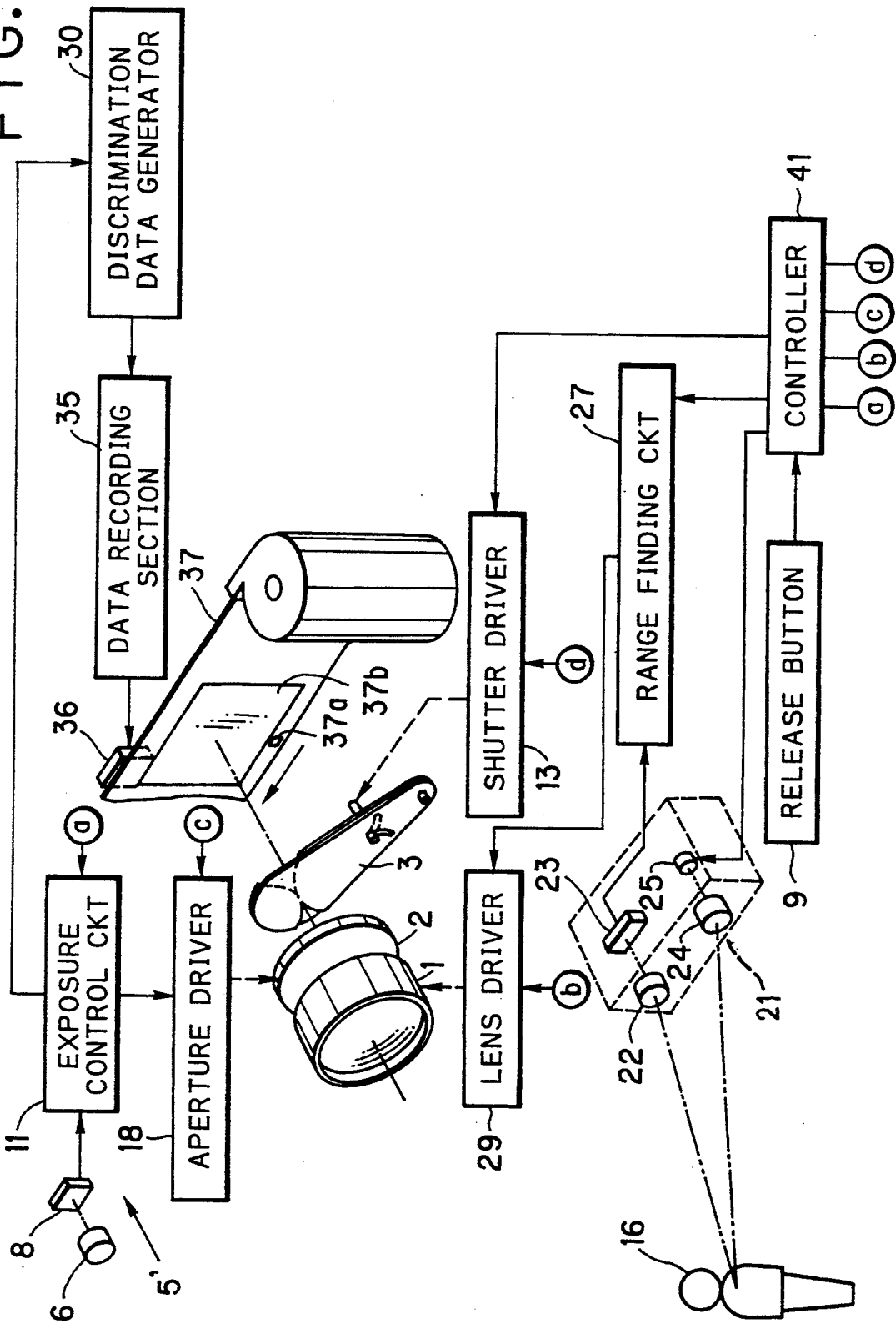
FIG. 8 is a schematic representation of a camera having a discrimination data recording function.

FIG. 8 shows a camera which records discrimination data for selecting a printing sequence. The camera has a conventional range finding unit 21 disposed on the front of the camera body (not shown). When a release button 9 is partially depressed, an LED 25 is caused to emit light so as to project a beam of near infrared light toward a primary subject 16 through a lens 24. The light reflected from the primary subject 16 falls incident on a line sensor 23 through a lens 22. A range finding circuit 27 detects a subject distance and generates corresponding data, depending on the incident position of the light on the line sensor 23, and sends the subject distance data to a lens driver 29.

An aperture mechanism 2 and a shutter mechanism 3 are disposed behind a taking lens 1. A brightness measurement section 5' is constructed by a lens 6 and an image sensor 8, and measures subject brightness values (BV) upon partial depression of a release button 9.

Figure 9:
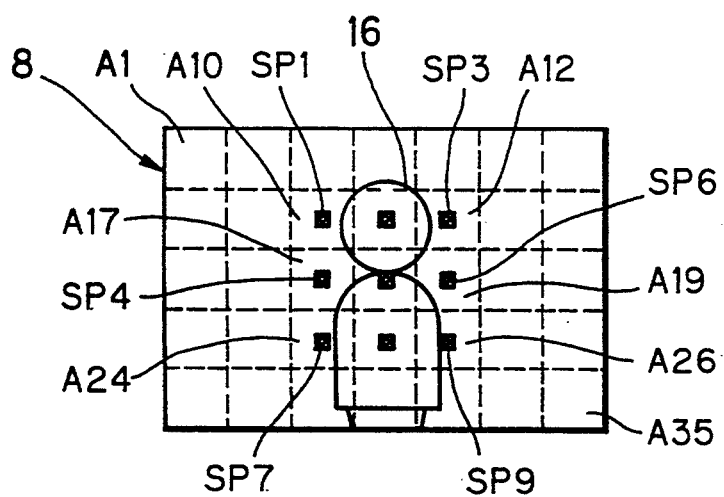
FIG. 9 is an explanatory view of an image area sensor for brightness measurement of the camera shown in FIG. 8.

The image area sensor 8 has divisional areas A1 to A35 arranged in a 7×5 matrix, as shown in FIG. 9, wherein brightness measurement spots SP1 to SP9 are disposed at the respective centers of the central areas A10 to A12, A17 to A19, and A24 to A26 of the divisional areas A1 to A35. When photographing, the release button 9 is partially depressed while the primary subject 16 is placed in the central areas, as shown in FIG. 9, so as to effect a focus-lock condition. The subject brightness values detected at the brightness measurement spots SP1 to SP9 are sent to an exposure control circuit 11 during the focus-lock condition.

The exposure control circuit 11 calculates a light value (LV) based on the respective subject brightness values and data of the film speed, and program-controls an aperture driver 18 and a shutter driver 13 according to the light value. The exposure control circuit 11 is also connected to a discrimination data generator 30. The discrimination data generator 30 outputs a discrimination signal to a data recording section 35, for discriminating whether the exposure control circuit 11 can properly perform an exposure control based on the primary subject brightness. That is, a discrimination signal, indicating that the exposure control of the camera is improper, is outputted when the light value for controlling the aperture drive 18 and the shutter driver 13 is out of a range dealt with in the program control, or when it is determined that the photographic conditions are such that proper brightness measurement is impossible.

For example, the cases where the camera cannot precisely perform the exposure in accordance with the command from the exposure control circuit 27 include the amount of flash light available is too high or too low. The flash light will be too low when a quotient obtained by division of the guide number by the subject distance is larger than a maximum aperture size or the aperture size determined by the exposure control circuit 11. For example, when making a flash photograph of a subject disposed in a relatively far range, or a night landscape photograph, such a lack of flash light may occur.

The flash light may be too high when, for example, making a flash photograph of a primary subject which is disposed at close range but is out of the center of the photographic field. At that time, it is possible that a low level background brightness is measured, and the exposure determination is affected by the low brightness level.

The condition where proper brightness measurement is impossible may arise, for example, when the size of the brightness measurement spot of the image area sensor 8 is substantially larger (e.g., by a factor of 2) than the size of an image of the primary subject formed on the image area sensor 8. Also, such a condition may arise when the size of the brightness measurement spot of the image area sensor is not substantially larger than the size of an image of the primary subject on the image area sensor 8 (e.g., less than a factor of 2) and the brightness difference in the photographic field is large (e.g., more than 8 EV). This is because in such a case the exposure determination will be affected by the background.

When the release button 9 is further depressed to its full extent, a controller 41 outputs an exposure start signal to the lens driver 29. Then the lens driver 29 moves the taking lens 1 so as to focus the lens 1 according to the subject distance data. The controller 41 also sends a signal for actuating the aperture driver 18 and the shutter driver 13 after completing the focusing of the taking lens 1. Thereby, the aperture 2 is adjusted according to the subject brightness, and thereafter the shutter 3 is opened for a given time so as to take an image of the subject on the photographic film 37 through the taking lens 1.

A data recording section 35 drives an LED 36 concurrently with the shutter release so as to optically record the discrimination data on the area outside the corresponding original frame 37b of the photographic film 37, for example, in the form of a bar code 38, as shown in FIG. 3.

Figure 10:
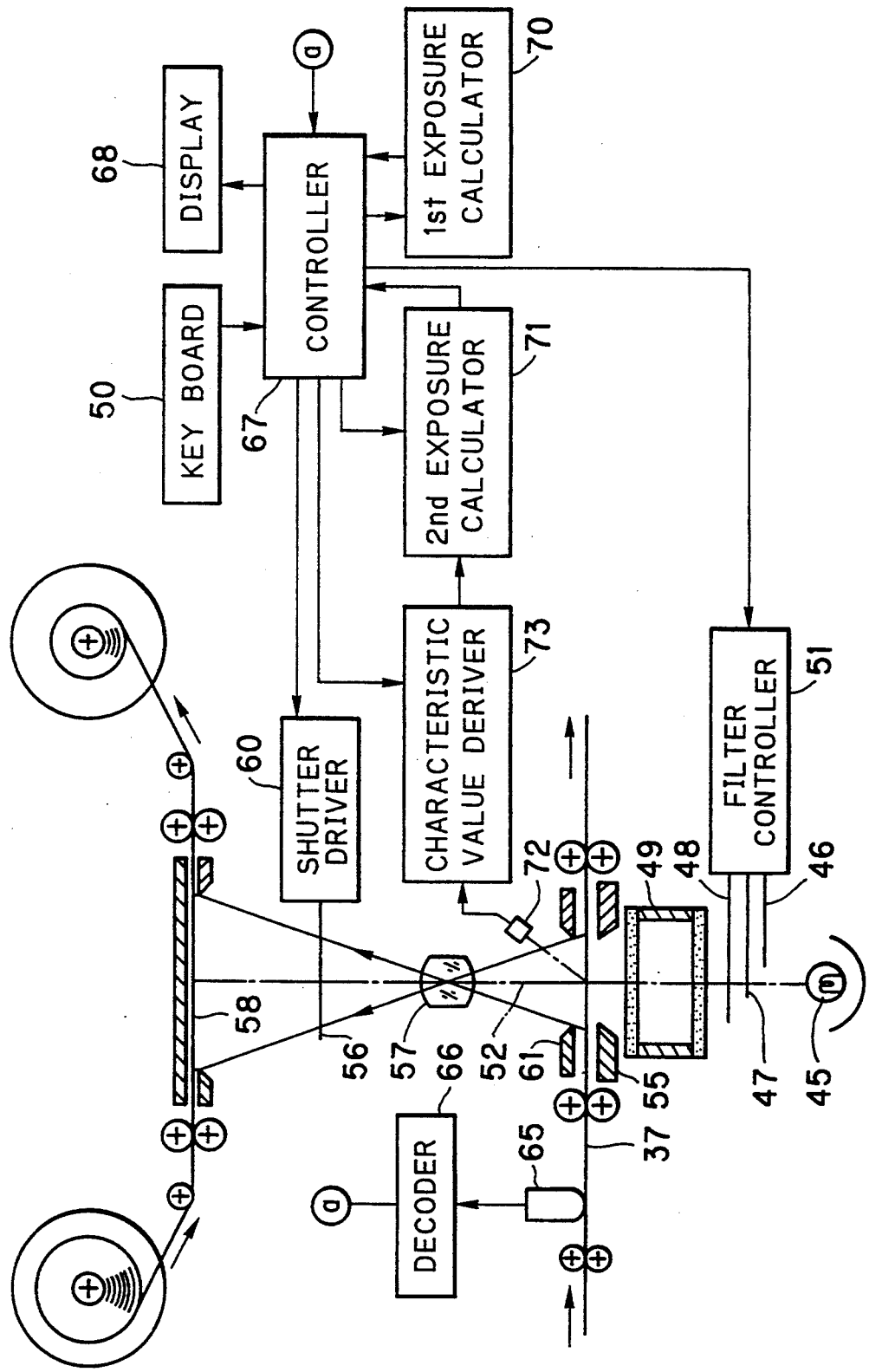
FIG. 10 is a schematic representation of a photographic printer for use in combination with the camera of FIG. 8.

FIG. 10 shows a photographic printer for use in the third embodiment of the present invention, wherein like or corresponding parts are designated by the same reference numerals as FIG. 4, and the description thereof is omitted for the sake of brevity. A controller 67, which may be a conventional microcomputer, sequentially controls the respective parts of the photographic printer according to a program stored in a ROM which is incorporated in the controller 67. Two exposure calculators 70 and 71 are connected to the controller 67. The first and second exposure calculators 70 and 71 are selectively utilized, depending on the discrimination data 38 recorded in association with the original frame being printed.

The first exposure calculator 70 is selected when the discrimination data associated with the original frame indicates that the original frame was photographed under an exposure value which was determined by placing emphasis on the brightness data of the primary subject. The first exposure calculator 70 calculates an exposure amount by correcting a predetermined constant print exposure amount according to the film speed, without using the density data of the original frame. This corrects for variation found in actual film speeds according to the type or manufacturer thereof, even though the films are sold as having the same standard film speed. For example, a type of photographic film produced as ISO 100-type film by a film manufacturer may actually have a film speed of ISO 120 in the strict meaning thereof, while a type of photographic film produced as ISO 100-type film by another manufacturer may have a film speed of ISO 70. Therefore, even when the camera has properly controlled the exposure based upon the film speed, the density of the original image of the primary subject may vary, depending on the film type. For this reason, it is necessary to correct the print exposure amount based on the film type.

The first exposure calculator 70 uses the following equation (1) for calculating the print exposure amount, which simplifies the principle of correction:

$$\log E_j = K_m(B_{kj}) + B_{nj} + K_j \qquad (1)$$

wherein
- $E_j$: print exposure amount;
- $K_m$: exposure correction coefficient determined based on the print magnification;
- $B_{kj}$: predetermined constant print exposure amount;
- $B_{nj}$: exposure correction amount determined based on the variance of film speed according to the film type;
- $K_j$: exposure correction amount determined based on the optical speed of the printing lens system and sensitivity of the photographic paper, as well as the characteristic related to the development process;
- $j$: one of the three primary colors R, G and B.

The second exposure calculator 71 is selected when the discrimination data associated with the original frame being printed indicates that the original frame was photographed under an improper exposure value, and calculates a print exposure amount in a conventional manner. The second exposure calculator 71 is also connected to a characteristic value deriver 73 for calculating characteristic values based on light measurement data from the original frame being printed detected by a scanner 72. The scanner 72, which consists of a lens and an image area sensor, is disposed so as to face the original frame set in a film carrier 55. The scanner 72 measures the pixels of the original frame to be printed, in a three color separation method, and sends the light measurement data to the characteristic value deriver 73. The characteristic value deriver 73 calculates an LATD (Large Area Transmitting Density) value, a maximum density, a minimum density, and the like, and sends these values to the second exposure calculator 71. The second exposure calculator 71 then calculates a corrected print exposure amount based on the characteristic values according to the following equation (2):

$$\log E_j = K_m \cdot C_j (D_j - D_{nj}) + B_{nj} + K_j \qquad (2)$$

wherein
- $C_j$: a slope value serves as a coefficient for adjusting the density and color balance of the print image according to the density of the image of the original frame
- $D_j$: LATD value of the original frame
- $D_{nj}$: LATD value of a normal film (standard LATD value)

It is to be noted that a high-light density or any other density of the image of the original frame may be used as the factors $D_j$ and $D_{nj}$ instead of the LATD value. The high-light density is detected by eliminating the shadow portions of the image.

Although two kinds of discrimination data are recorded in the above-described embodiment, that is, one for a properly exposed original frame and the other for an improperly exposed original frame, it is, of course, possible to record the discrimination data only in association with those original frames which were photographed properly by the automatic exposure control of the camera. It is also possible to record the discrimination data only in association with those original frames which were not properly exposed by the automatic exposure control of the camera.

Figure 11:
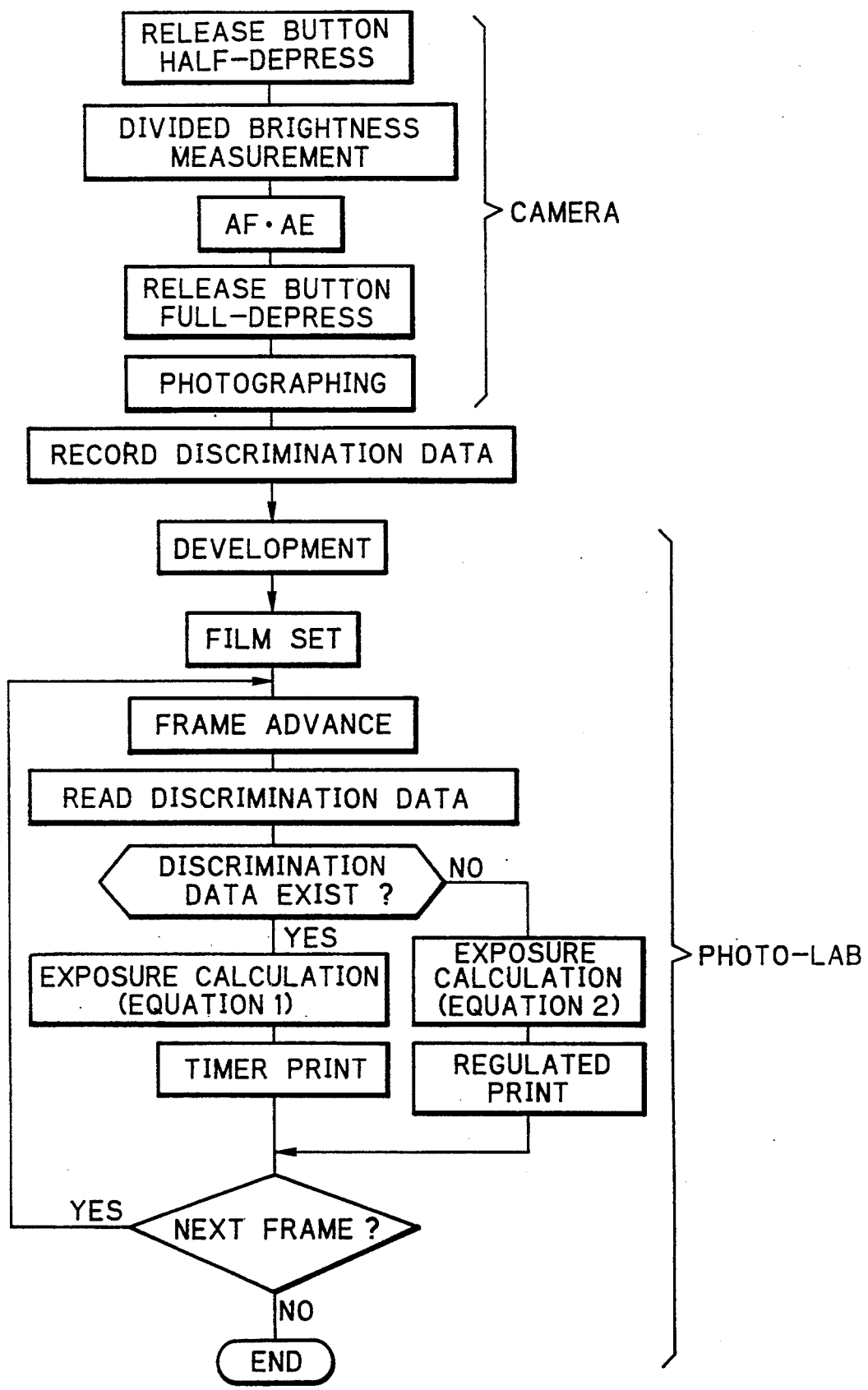
FIG. 11 is a flow chart illustrating the procedure of making photographic prints according to the embodiment of FIGS. 8 to 10.

FIG. 11 illustrates a procedure of making photographic prints in the photographic printer of FIG. 10 in combination with the camera of FIG. 8 under the assumption that the discrimination data 38 is recorded only in association with original frames which have been photographed under proper exposure conditions.

First, when the release button 9 is partially depressed while aiming the camera at a subject, a focus-lock condition is provided. Simultaneously, an automatic exposure control is performed based on the brightness measurement spots SP1 to SP9. Thereafter, the camera can be moved for reframing the subject as desired. When the release button 9 is fully depressed, the aperture 2 and the shutter mechanism 3 are program-controlled so as to photographically expose the photographic film 37 in an amount according to the subject brightness of the focus-locked subject. Furthermore, the discrimination data is recorded in the form of the bar code 38, on the photosensitive emulsion surface of the photographic film 37 in a position corresponding to the original frame photographed, for indicating that this original frame was taken under a proper exposure condition. No discrimination data is recorded if the original frame is photographed under improper exposure conditions.

After completing the exposure of a strip of photographic film 37, the exposed photographic film 37 is forwarded to a photofinishing laboratory, wherein the photographic film 37 is subjected to development and printing. In printing, a bar code reader 65 reads the bar code 38 recorded on the photographic film 37. A decoder 66 converts the bar code signal into the discrimination data and sends the discrimination data to the controller 67.

The controller 67 selects either the first or the second exposure calculator 70 or 71, based upon the discrimination data, in the manner described above. Namely, the first exposure calculator 70 is selected for the original frame having discrimination data associated therewith. Based on the print exposure amount calculated in the first exposure calculator 70, the controller 67 controls the printing process. Because a constant value is predetermined as the print exposure amount for each film type, that is, according to the actual film speed of the photographic film, in the first exposure calculator 70, a timer is used for printing so as to provide the constant print exposure time. During the timed print, color correction filters 46 to 48 are inserted into the print light path by respectively predetermined amounts, each of which corresponds to an exposure amount of each color determined, depending on the color sensitivity of each type of film. The color corrected light is thus projected for a predetermined time for each filter type.

In place of the above-described printing method, it is possible to first project print light without inserting color correction filters 46 to 48 in the light path and, thereafter, sequentially insert the color filters so as to cut out the color components of the print light when the exposure amount of that color reaches the above-described predetermined amount.

The controller 67 selects the second exposure calculator 71 for printing the original frames having no discrimination data associated therewith. In this case, the scanner 72 is activated to measure the three color densities of each pixel of the original frame to be printed, and sends the three color densities to the characteristic value deriver 73. The characteristic value deriver 73 calculates the LATD value and other characteristic values of the original frame, and sends them to the second exposure calculator 71. The second exposure calculator 71 calculates a print exposure amount according to equation (2), and sends the calculated amount to the controller 67. The controller 67 calculates the respective filter set values based on the print exposure amount, and controls a filter controller 51 so as to adjust the color balance and color intensities of the print light in accordance with the filter set values.

Although the first exposure calculator uses equation (1) in the above-described embodiment, it is possible to use the following equation (3) for more precise exposure control. In equation (3), an exposure correction amount Blj is determined according to the light source type for photographing and an exposure correction amount Bcj is determined according to the camera type in addition to the factors of equation (1):

$$\log Ej = Km(Bkj) + Bnj + Blj + Bcj + Kj \qquad (3)$$

As mentioned above, the discrimination data may be recorded in forms other than a bar code. For example, optical marks or magnetic marks may be recorded as the discrimination data.

Furthermore, the discrimination data may be manually entered through a keyboard or the like, instead of the above-described automatic recording. In this case, it is preferable to record the discrimination data for the original frames which are desired to be printed by using the first exposure calculator 70. In this way, it is possible to print the original frame taking the photographic condition into consideration, so as to obtain a photographic print which reflects the intention of the photographer.

Figure 12:
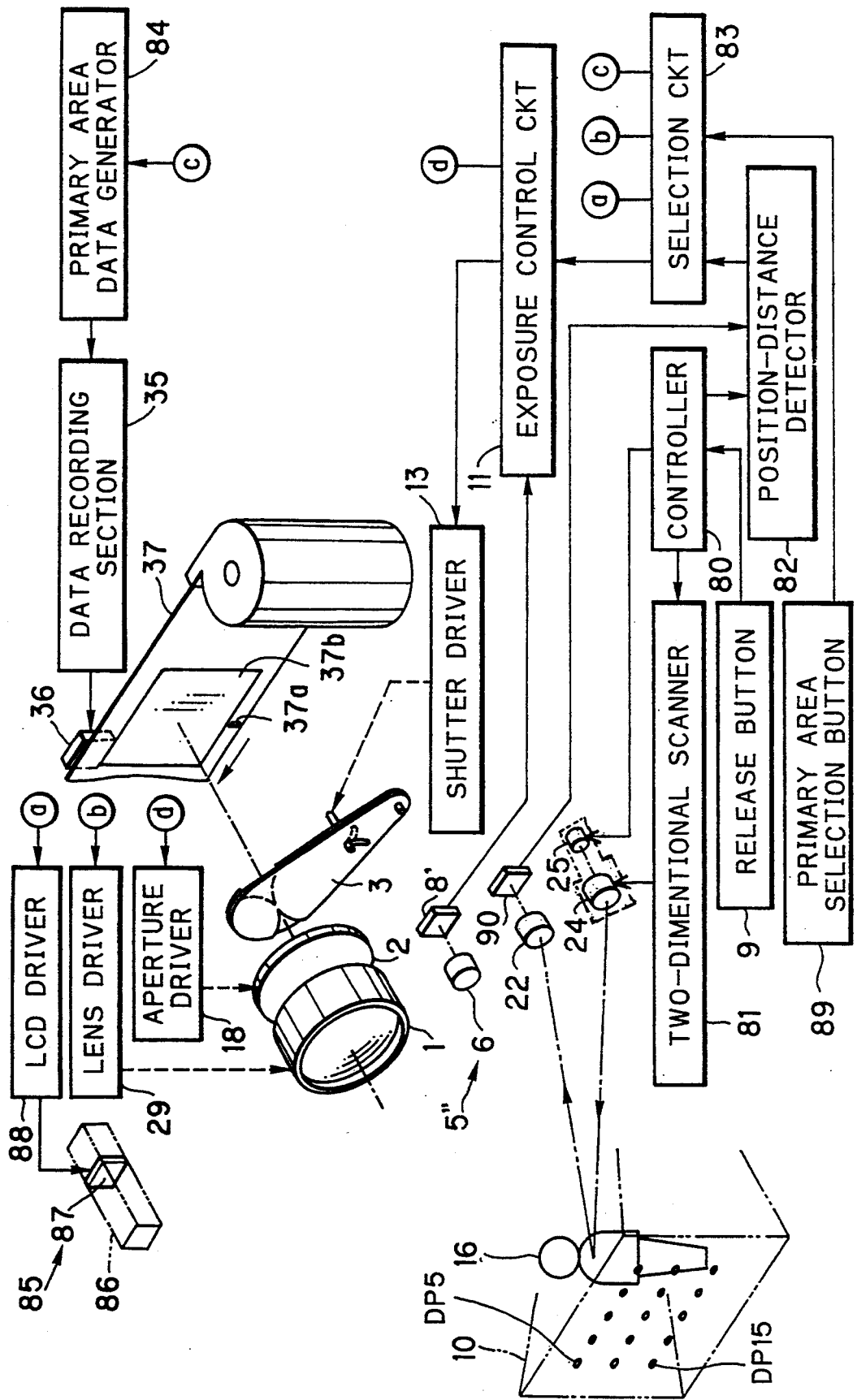
FIG. 12 is a schematic illustration of a camera having a primary subject position data recording function.
Figure 13:
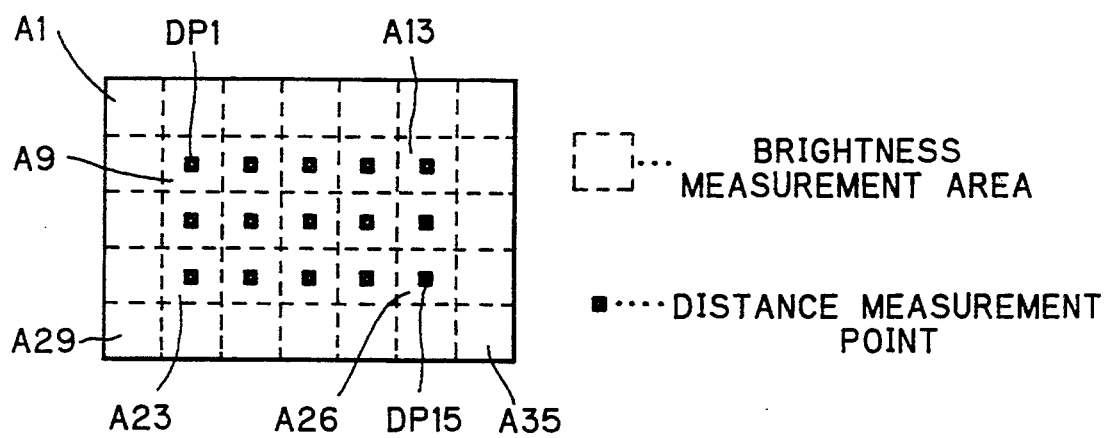
FIG. 13 is an explanatory view of divisional areas of the camera shown in FIG. 12.

FIG. 12 illustrates a camera which records primary area data. Corresponding parts in FIG. 12 are designated by the same reference numerals as the above-described embodiments, and the following description thereof only relates to the essential parts of this embodiment. A light projecting section includes a lens 24 and a light source 25 for projecting a near infrared beam of light toward a subject. According to the embodiment of FIG. 12, the photographic frame of the camera is divided into a plurality of areas A1 to A35 arranged in a 7×5 matrix, as shown in FIG. 13, and distance measurement points DP1 to DP15 are disposed at the centers of the central areas A9 to A13, A16 to A20, and A23 to A27 of these divisional areas A1 to A35.

When a release button 9 is partially depressed, a controller 80 controls the light source 25 and a two-dimensional scanner 81 such that the light source 25 emits a spot light intermittently and that the two-dimensional scanner 81 drives the light projecting section so as to scan a photographic scene 10 with the spot light. As a result, the spot light sequentially illuminates the distance measurement points DP1 to DP15 of the photographic scene 10. The light is projected intermittently toward a subject 16 so as to be reflected from the subject 16 and fall incident on an incident position detector, for example, an image area sensor 90, through a lens 22.

The controller 80 has a pulse counter for counting drive pulses applied to the two-dimensional scanner 81 so as to detect the scanning position of the light projecting section with respect to the photographic scene 10, that is, the scanning position within the frame. The scanning position signal is sent to a position-distance detector 82. The position-distance detector 82 also receives an output signal from the image area sensor 90, and determines the presence or absence of the subject 16 depending on whether the image area sensor 90 receives the reflected light. The position-distance detector 82 detects the incident position of the reflected light on the image area sensor 90 based on a time sequential signal from the image area sensor 90, and detects the position and the distance of the subject 16 based on the relationship between the incident position and the scanning position in the frame. It is possible to continuously activate the light source 25 so as to scan the photographic scene 10 linearly line by line.

When there are a plurality of subjects in the photographic scene 10, the position and the distance of each subject are detected. A selection circuit 83 determines a primary subject on the basis of the position data and the distance data of the plurality of subjects. According to this embodiment, the subject disposed at the nearest range of all the subjects is first selected as the primary subject. It is to be noted that it is also possible to select the subject disposed at a position nearest to the center of the photographic scene 10 as the primary subject.

The selection circuit 83 outputs a primary area signal representing the areas of the divisional areas A1 to A35 which contain the selected primary subject. The primary area signal is sent to a lens drive 29, an exposure control circuit 11, a primary area data generator 84, and a finder display section 85.

Figure 14:
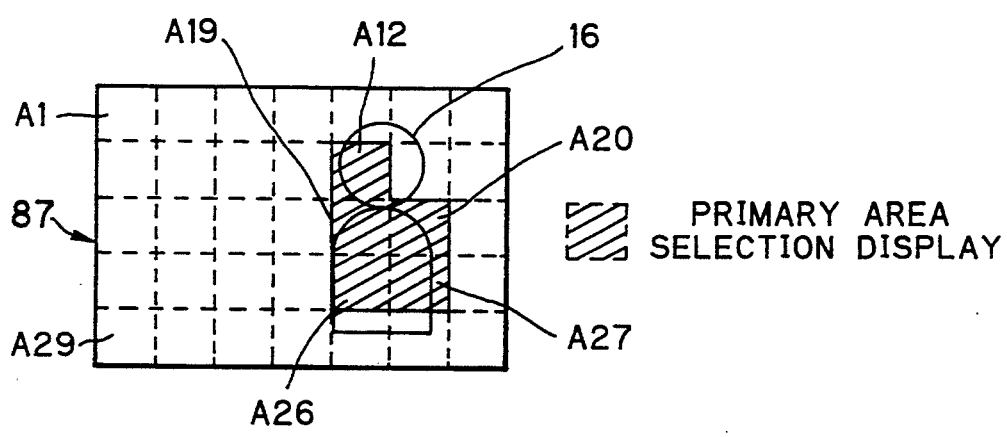
FIG. 14 is an explanatory view of an LCD panel disposed in a viewfinder of the camera of FIG. 12.

The finder display section 85 is constructed by a transparent LCD panel 87 disposed in a viewfinder 86, and an LCD driver 88. The LCD panel 87 is divided into segments arranged in a 7×5 matrix, correspondingly to the divisional areas A1 to A35, as shown in FIG. 14. The segments which correspond to the primary area designated by the primary area signal from the selection circuit 83, for example, the areas A12, A19, A20, A26 and A27, are driven to slightly increase the density of these segments compared with the other display segments, as illustrated by the hatched area in FIG. 14. Because the subject can be viewed through the segments in this semitransparent condition, it is possible to visually confirm whether the selected primary area actually contains the primary subject intended by the photographer. As shown, when the selected primary subject extends over several divisional areas, all the corresponding segments are driven so as to be semitransparent.

If there are several subjects in the photographic scene 10, the selection circuit 27 first drives the LCD panel 87 to make those segments which correspond to the divisional areas containing the nearest subject semitransparent in an intermittent fashion. If the desired primary subject is in the intermittently driven segments, the photographer can fully depress the release button 9, thereby executing an exposure. If the desired primary subject is not in these segments, the photographer depresses a primary area selection button 89. Then, the selection circuit 83 outputs a primary area signal corresponding to the second nearest subject to the LCD driver 88. The LCD panel 87 then displays these segments which correspond to the secondary selected primary area to be semitransparent intermittently. If the primary subject is contained in the secondary selected segments, the release button 9 is depressed to execute an exposure. If the primary subject is not contained in these segments, the primary area selection button 89 is depressed again to display the third primary area, and so on.

A light measurement section 5" is constructed by a lens 6 and an image area sensor 8' for brightness measurement. The image area sensor 8' is also divided into a plurality of brightness measurement areas arranged in a 5×7 matrix corresponding to the brightness measuring areas A1-A35, shown in FIG. 13. However, the number of brightness measurement areas may be varied. When the release button 9 is partially depressed, the image area sensor 8' measures the subject brightness values (BV) of the respective brightness measurement areas A1 to A35. The subject brightness values are sent to the exposure control circuit 11. Because the exposure control circuit 11 also receives the primary area signal from the selection circuit 83, the exposure control circuit 11 calculates a light value (LV) based on the subject brightness data of those brightness measurement areas which contain the primary subject in combination with film speed data, and program-controls the aperture driver 18 and the shutter driver 13. The exposure controller 11 may also control a flash unit so as to cause the flash unit (not shown) to flash automatically in synchronism with the shutter release operation.

The primary area data generator 84 codes the primary area signal and sends the coded primary area data to a data recording section 35. The data recording section 35 drives an LED 36 to record the primary area in a blank space outside a corresponding original frame 37b on photographic film 37 in the form of a digital code or the like, for example, a bar code 38 as shown in FIG. 3.

Figure 15:
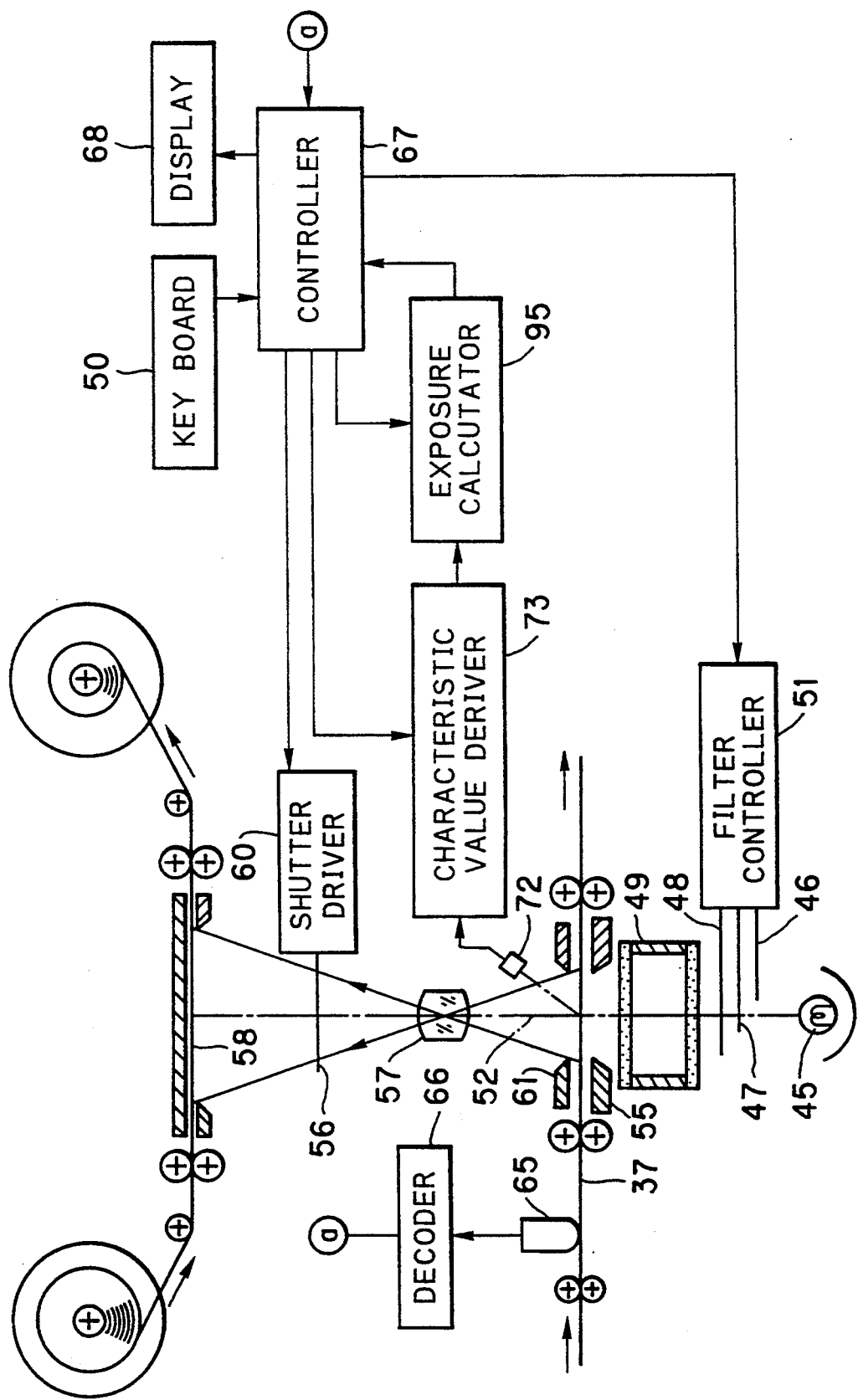
FIG. 15 is a schematic representation of a photographic printer for use in combination with the camera of FIG. 12.

FIG. 15 shows a photographic printer for use in combination with the camera of FIG. 12, wherein like or corresponding parts are designated by the same reference numerals as the above-described embodiments, and the detailed description thereof is omitted for the sake of brevity.

Figure 16:
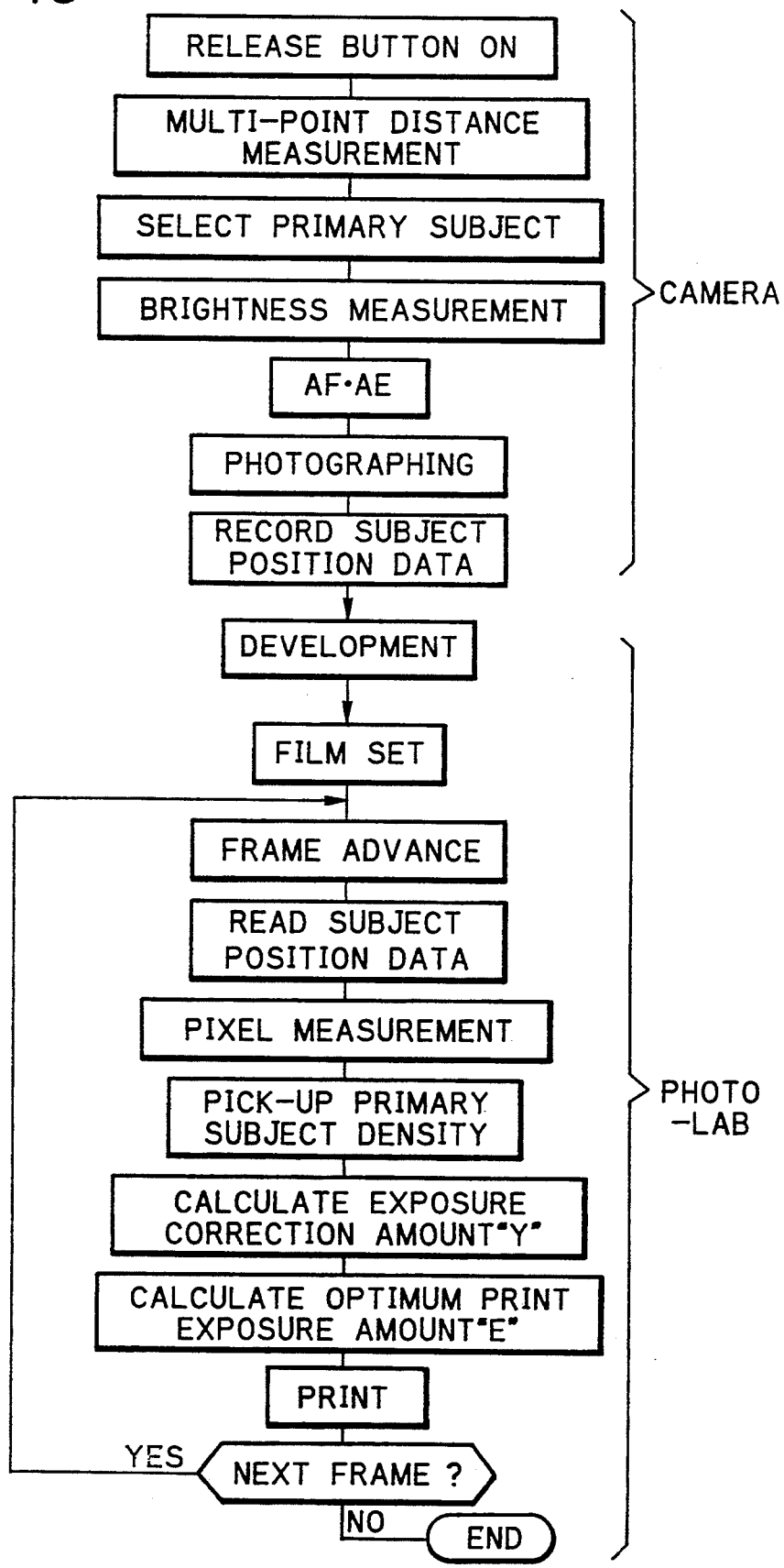
FIG. 16 is a flow chart illustrating the procedure of making photographic prints according to the embodiment shown in FIGS. 12 to 15.

The procedure of making photographic prints according to the embodiment shown in FIGS. 12 to 15 will be described with reference to the flow chart of FIG. 16.

First, a multi-point distance measurement is performed by the camera, and the selection circuit 83 determines the position of the primary subject based on the distance measurement values in the manner described above. Thereafter, brightness measurement is performed for areas which contain the primary subject, and an exposure is performed under the exposure control which is based on the brightness measurement values. Furthermore, the position data of the primary subject, is recorded as a bar code, or the like, on the photosensitive emulsion surface of the photographic film in association with the corresponding original frame.

After completing the exposure, the photographic film 37 is subjected to developing and printing in a photofinishing laboratory. During printing, a bar code reader 65 reads the bar code 38 recorded on the photographic film 37, and a decoder 66 converts the bar code signal into primary area data and sends the same to a controller 67 of the photographic printer. A scanner 72 measures the pixels of the original frames set in a printing position in a three color separation method. A characteristic value deriver 73 derives a density of the original image of the primary subject based on the primary area data and the photometric values of the respective pixels. An exposure calculator 95 calculates an exposure correction amount based on the density of the primary subject, and calculates a proper print exposure amount by adding the exposure correction amount to a basic print exposure amount which is predetermined based upon the assumption that the original frame was photographed with a proper exposure value. The controller 67 calculates a printing exposure time based on the calculated proper print exposure amount, and controls the shutter driver 60 corresponding to the printing exposure time. It is to be noted that it is possible to predetermine a basic exposure time corresponding to the basic print exposure amount, and add a correction time determined based on the exposure correction amount to the basic exposure time, so as to determine a proper print exposure time.

The exposure correction amount is calculated as follows. First, the position of the primary subject in the original frame 37b is determined based on the primary area data, and the density distribution of the image within the area that contains the primary subject is detected, so as to distinguish the primary subject from the background. The density of the primary subject is derived based upon the density distribution of the primary subject and the background. The exposure correction amount for the basic print exposure amount is determined based on the primary subject density, so as to optimize the print density of the primary subject in the photographic print.

Although the above-described embodiment uses data representing the divisional brightness measurement areas in which the primary subject is present, as the photographic data to be taken into consideration in determining the print exposure amount, it is possible to use the brightness measurement values of the respective brightness measurement areas, aperture size data, shutter speed data, object distance data, camera magnification data and/or other photographic data in combination with the primary area data. The brightness measurement values of the respective brightness measurement areas, the aperture size and the shutter speed are useful for determining the basic exposure amount. Accordingly, it is possible to more precisely control the print exposure amount. The object distance and the camera magnification are useful for estimating the primary subject in the original frame.

Because there are differences between exposure control functions in various cameras, it may also be desirable to record the camera type as photographic data on the photographic film in order to vary the basic print exposure amount according to the camera type.

Although the photographic data including the discrimination data and the primary area data are optically recorded on the photosensitive emulsion surface of the photographic film in the form of bar code in the above-described embodiments, it is possible to record the photographic data magnetically on a magnetic recording layer formed on the photographic film. The magnetic recording layer may be formed in an area outside the image recording portion of the photographic film, or may be made of a transparent magnetic substance and applied over the entire surface of one side of the photographic film opposite the photosensitive emulsion surface. It is preferable to use transparent magnetic base materials for the magnetic recording layer made of a transparent magnetic substance. Examples of such substances are disclosed in U.S. Pat. Nos. 4,302,523, 3,782,947, and 5,279,945.

It is also possible to record the photographic data electrically in an electric memory medium, such as a memory chip incorporated in the film cartridge, a memory card attached to the camera, or the like.

While the present invention has been described in detail above with reference to a preferred embodiment shown in the drawings, it will be apparent to those skilled in the art that various changes and modifications of the present invention are possible without departing from the scope of the invention as defined by the following claims.

What is claimed is:

1. A method of making photographic prints from original frames recorded on a photographic film, each of said original frames having an image of a scene formed thereon consisting of a primary subject and a background, said method comprising the steps of:
   recording discrimination data, for designating one of a first and a second printing method on a recording medium in association with each of said original frames when said images are formed in original frames by photographing said scene with a camera;
   reading said discrimination data when printing said original frames onto a photographic medium; and
   selecting one of said first and said second printing methods based on said discrimination data, for printing each of said original frames onto said photographic medium at a print exposure amount which is determined by using said one of said first and second printing methods, said first printing method calculating said print exposure amount on the basis of image density data obtained by measuring said original frame, and said second printing method calculating said print exposure amount by correcting a predetermined print exposure amount according to the type of said photographic film without utilizing said image density data.

2. A method of making photographic prints as recited in claim 1, wherein said discrimination data indicates selected ones of original frames which are photographed under photographic conditions for which the camera can photograph said original frame at a proper exposure value based on said primary subject, said second printing method being selected when said discrimination data is read during reading step.

3. A method of making photographic prints as recited in claim 1, wherein said discrimination data indicates selected ones of said original frames which are photographed under photographic conditions for which the precision of exposure control of the camera does not allow proper exposure, said first printing method being selected when said discrimination data is read during said reading step.

4. A method of making photographic prints as recited in claim 3, wherein said discrimination data indicates selected ones of said original frames which are photographed under a photographic condition for which the camera judges whether or not the exposure control system of the camera allows for proper exposure by measuring light values of said scene.

5. A method of making photographic prints as recited in claim 4, wherein said discrimination data indicates selected ones of said original frames which are photographed under a photographic condition wherein available flash light is is less than a correct amount.

6. A method of making photographic prints as recited in claim 4, wherein said discrimination data is recorded in association with said selected ones of said original frames which are photographed under photographic conditions wherein an incorrect brightness measurement is obtained because the size of brightness measuring elements of the camera is larger than the primary area of an image of said primary subject focused on a brightness measurement device.

7. A method of making photographic prints as recited in claim 1, wherein said discrimination data comprises first discrimination data and second discrimination data, said first discrimination data being recorded in association with corresponding ones of said original frames which are photographed under photographic conditions wherein the precision of the exposure control of the camera does not allow proper exposure, and said second discrimination data being recorded in association with corresponding ones of said original frames which are photographed under photographic conditions for which the camera can photograph at a proper exposure value based on said primary subject, said first printing method being selected when said first discrimination data is read during said reading step, and said second printing method being selected when said second discrimination data is read during said reading step.

8. A method of making photographic prints from original frames recorded on a photographic film, each of said original frames having an image of a scene consisting of a primary subject and a background, said method comprising the steps of:
   recording photographic data representing photographic conditions in association with each of said original frames when said original frames are formed by photographing said scene with a camera;
   reading said photographic data during printing of said original frames onto a photographic medium;
   judging, based on said photographic data, whether or not said original frame was photographed by a camera under proper photographic conditions wherein exposure control was properly based on said primary subject;

selecting one of a first printing method when said original frame is improperly exposed, and a second printing method when said original frame is photographed under the proper photographic conditions, said first printing method calculating a print exposure amount on the basis of image density data obtained by measuring said original frame during printing, said second printing method calculating a print exposure amount by correcting a predetermined print exposure amount according the type of said photographic film.

9. A method of making photographic prints as recited in claim 1, wherein said recording medium is at least a portion of said photographic film.

10. A method for making photographic prints from original frames recorded on a photographic film, said method comprising the steps of:

forming said original frame by photographing a scene containing a primary subject by means of a camera, said camera having a focus-lock function for measuring a distance of said primary subject while framing said scene such that said primary subject is disposed in a center of a viewfinder of the camera, a divided brightness measurement function for measuring brightness values in a plurality of divisional areas of said scene at the time of focus-locking, an automatic exposure control function for controlling exposure for photographing said scene on said photographic film based on brightness data obtained by said brightness measurement function, and a data recording function for recording photographic data on a recording medium; and recording said brightness data for said plurality of divisional areas on said recording medium during said forming steps; and controlling print exposure for making said photographic print from said original frame in a photographic printer by determining a print exposure amount based on a constant basic print exposure amount, which is independent of the image density of said original frame to be printed, and a correction amount for correcting said basic print exposure amount, said basic print exposure amount being a value necessary for printing a standard original frame recorded on a standard photographic film onto a photographic paper in an optimum condition, and said correction amount being determined based on said photographic data.

11. A method of making photographic prints as recited in claim 10, wherein recording step comprises recording said photographic data while placing emphasis on the brightness values measured in a central area of said scene.

12. A method of making photographic prints as recited in claim 11, wherein said recording step comprises recording said brightness values measured in said plurality of divisional areas, recording central brightness data of the central area of said scene and peripheral brightness data of a peripheral area of said scene, said central area brightness data and said peripheral area brightness data being derived from said brightness values of said divisional areas, and said controlling step comprises calculating correction amount according to a separate equation which is associated with each of a plurality of ranges defined in a two-dimensional coordinate system representing said central area brightness data and said peripheral area brightness data as parameters thereof, said equations containing said brightness values of said divisional areas.

13. A method of making photographic prints as recited in claim 11, wherein said recording step comprises recording said brightness values measured in said plurality of divisional areas, recording at least one of central brightness data of the central area and peripheral brightness data of a peripheral area of said scene, and camera magnification data, said central area brightness data and said peripheral area brightness data being derived from said brightness values of said divisional areas, and said controlling step comprises calculating said correction amount based upon a separate equation which is determined for each of a plurality of ranges defined in a two-dimensional coordinate system representing at least one of said central area brightness data and said peripheral area brightness data and said camera magnification data as parameters thereof, said equations containing at least one of said central area brightness data, said peripheral area brightness data, and said magnification data.

14. A method of making photographic prints as recited in claim 11, wherein said recording step comprises recording said brightness values measured in said plurality of divisional areas, recording brightness difference data relating to a brightness difference between the central area and a peripheral area of said scene, and recording camera magnification data, and said controlling step comprises calculating said correction amount based upon a separate equation which is determined for each of a plurality of ranges defined in a two-dimensional coordinate representing said brightness difference data and said camera magnification data as parameters thereof, said equations including said brightness difference data and said magnification data.

15. A method of making photographic prints as recited in claim 11, wherein said recording step comprises recording said brightness values measured in said plurality of divisional areas, recording central area brightness data representing the brightness of the central area of said scene, recording peripheral area brightness data representing the brightness of a peripheral area of said scene, and recording camera magnification data, said central area brightness data and said peripheral area brightness data being derived from said brightness values of said divisional areas, and said controlling step comprises calculating said correction amount according to a separate equation which is determined for each of a plurality of ranges defined in a three-dimensional coordinate system representing said central area brightness data, said peripheral area brightness data and said camera magnification as parameters p, said equations containing said central brightness data, said peripheral brightness data, and said magnification data.

16. A method of making photographic prints as recited in claim 11, wherein said recording step comprises recording said photographic data on said photographic film.

17. A method of making photographic prints from original frames, comprising the steps of:

forming said original frames by photographing a scene containing a primary subject with a camera, said camera having a multi-autofocusing function by which distance measurement of said scene is performed at a plurality of measurement points, said primary subject being discriminated based on distance measurement data representing said measurement points, so as to focus a taking lens of the camera, said camera also having a divided brightness measurement function by which said scene is divided into a plurality of areas corresponding to said measurement points, for measuring brightness values in said divided brightness measurement areas and recording brightness data corresponding to said brightness values, an automatic exposure control function for controlling exposure of photographing while placing emphasis on the brightness value of at least one of said divided brightness measurement areas which corresponds to at least one of said measurement points at which said primary subject is detected, and a data recording function for recording position data representing a position of said primary subject within said original frame on a recording medium;

recording said brightness data and said position data during said forming step;

reading said position data of said primary subject during a printing operation;

controlling print exposure for making said photographic print from said original frame by determining a print exposure amount based on a constant basic print exposure amount which is independent of image density of said original frame to be printed, and a correction amount for correcting said basic print exposure amount, said basic print exposure amount being a value necessary for printing a standard image recorded on a standard photographic film onto a photographic medium under optimum conditions, said correction amount being calculated based on density data of an image of said primary subject which is detected from said original frame based on said position data of said primary subject.

18. A method of making photographic prints as recited in claim 17, wherein said camera further includes a viewfinder having a liquid crystal display panel, said liquid crystal display panel having a plurality of finder areas which correspond to said plurality of brightness measurement areas, said method further comprising the step of displaying at least one of said finder areas which corresponds to said discriminated primary subject, distinctively from other finder areas in said viewfinder.

19. A method of making photographic prints as recited in claim 18, wherein said camera further includes a primary area selecting function by which, when said multi-autofocus function detects a plurality of objects, said method further comprising sequentially indicating said objects by distinctively displaying at least one of said finder areas which corresponds to each of said objects, in an order beginning with the object for which the probability of being said primary subject is highest, so as to allow selection of said primary subject among from said objects by a photographer.

20. A method of making photographic prints as recited in claim 19, further comprising the step of distinctively displaying said at least one finder area corresponding to each of said objects in an intermittent fashion.

21. A method of making photographic prints as recited in claim 20, wherein said recording step comprises recording said photographic data on said photographic film.

* * * * *